M. B. LLOYD.
HAND CAR.
APPLICATION FILED JUNE 16, 1906.

908,785.

Patented Jan. 5, 1909.

2 SHEETS—SHEET 1.

WITNESSES.
A. M. Walstrom
J. H. Baldwin

INVENTOR
MARSHALL B. LLOYD
BY Paul & Paul
HIS ATTORNEYS

M. B. LLOYD.
HAND CAR.
APPLICATION FILED JUNE 16, 1906.
908,785.
Patented Jan. 5, 1909.
2 SHEETS—SHEET 2.
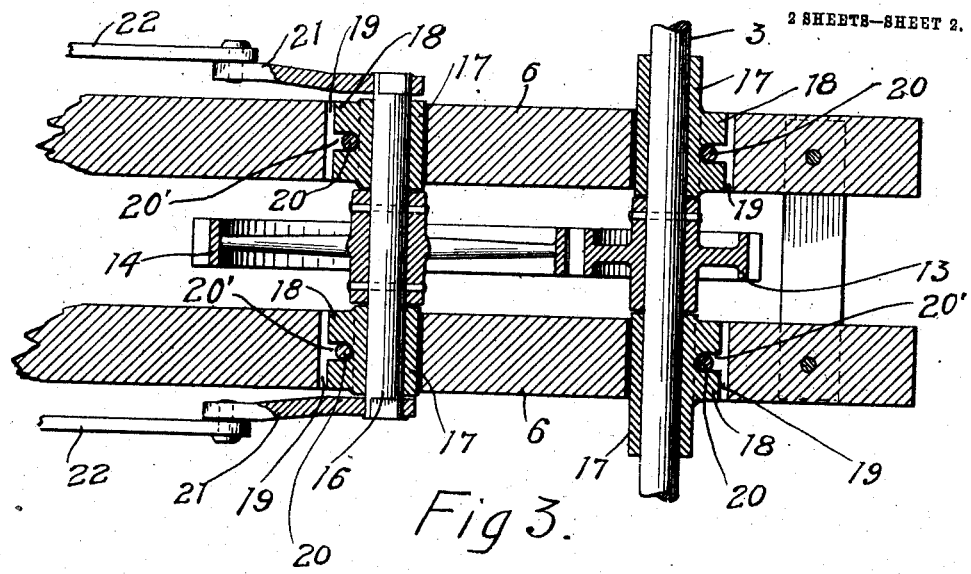
Fig 3.
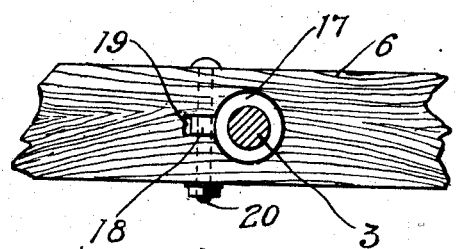
Fig 5.
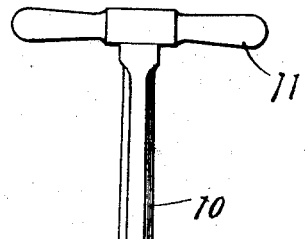
Fig 6.
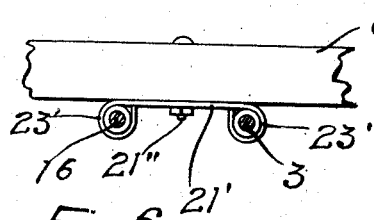
Fig 4.
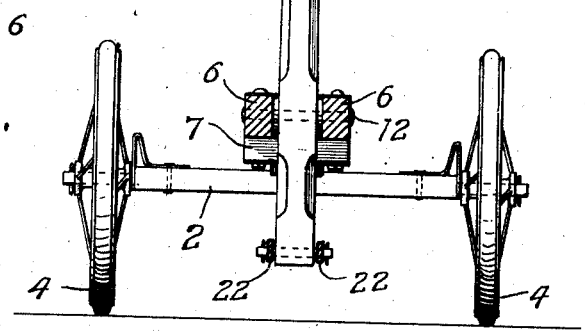
WITNESSES
C. M. Wahlstrom
J. H. Baldwin
INVENTOR
MARSHALL B. LLOYD.
BY Paul & Paul
HIS ATTORNEYS
THE NORRIS PETERS CO., WASHINGTON, D. C.

UNITED STATES PATENT OFFICE.

MARSHALL B. LLOYD, OF MINNEAPOLIS, MINNESOTA.

HAND-CAR.

No. 908,785.      Specification of Letters Patent.      Patented Jan. 5, 1909.

Application filed June 16, 1906. Serial No. 322,037.

*To all whom it may concern:*

Be it known that I, MARSHALL B. LLOYD, of Minneapolis, county of Hennepin, State of Minnesota, have invented certain new and useful Improvements in Hand-Cars, of which the following is a specification.

My invention relates to children's self-propelled hand cars and the object of the invention is to provide means whereby the power applied to drive the car will be equally and evenly distributed through the gear mechanism connecting the propelling lever with the car axle.

A further object is to provide a car having a driving mechanism of simple but very strong and durable construction.

Other objects of the invention will appear from the following detailed description.

The invention consists generally in the various constructions and combinations, all as hereinafter described and particularly pointed out in the claims.

Figure 1:
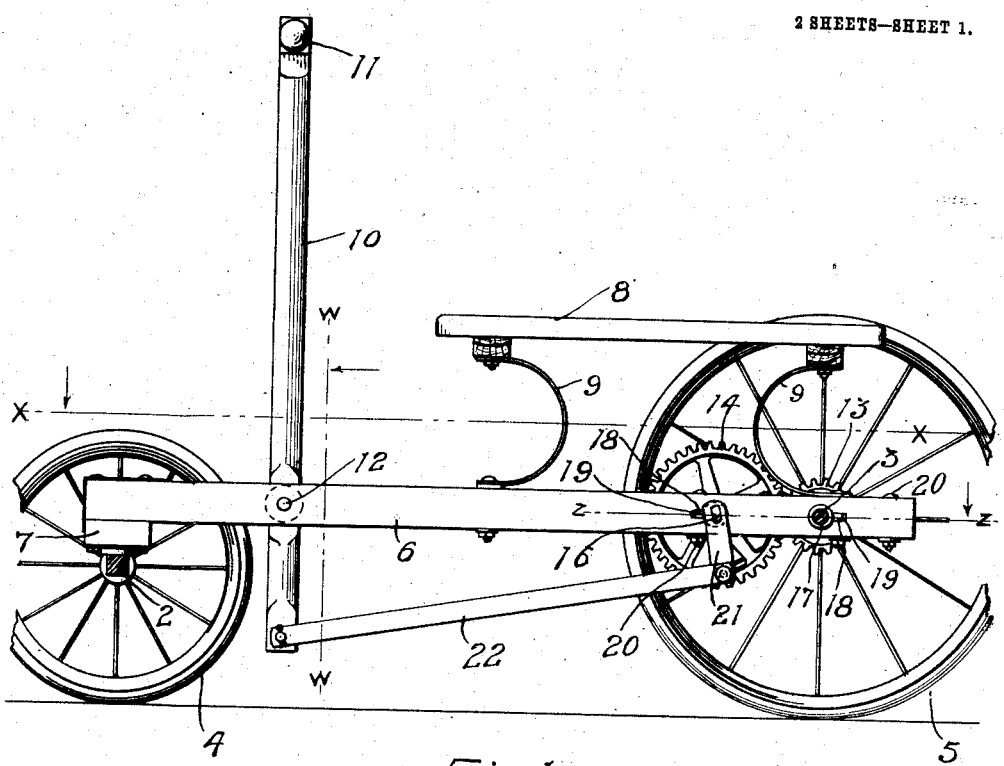
Figure 2:
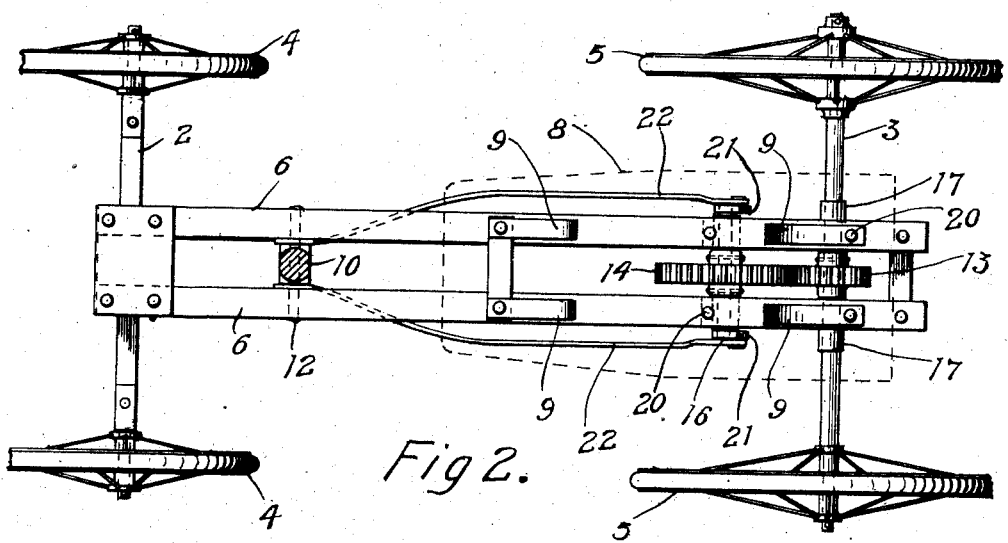

In the accompanying drawings, forming part of this specification; Figure 1 is a side elevation of a hand car embodying my invention. Fig. 2 is a sectional view substantially on the line $x$—$x$ of Fig. 1. Fig. 3 is a sectional view on the line $z$—$z$ of Fig. 1. Fig. 4 is a vertical sectional view on the line $w$—$w$ of Fig. 1. Fig. 5 is a detail view illustrating the movable shaft bearing. Fig. 6 is a detail view showing another form of movable bearing for the rear axle and counter shaft.

In the drawing, 2 and 3 represent the forward and rear axles respectively, having carrying wheels 4 and 5. Reaches 6 are provided connecting the forward and rear axles and having a bolster 7 at their forward ends whereon the forward axle is swiveled, sufficient space being provided on each side of the bolster seated on the car, to place the feet for the purpose of oscillating the forward axle and steering the vehicle. A seat 8 supported on springs 9 is arranged upon the reaches and in front of the seat an operating lever 10 having handles 11 at its upper end, is pivoted on a bolt 12 which extends through the reaches from side to side. A pinion 13 is mounted on the rear axle preferably between the rear ends of the reaches, and meshes with a gear 14 secured on a shaft 16 which has bearings at each end in the reaches and projects through and beyond the same on each side. The bearings which I prefer to employ for the ends of the shaft consist of sleeves 17 fitting within sockets in the reaches and having flanges 18 projecting into slots 19 leading from said sockets and loosely held therein by bolts 20 which pass down through the reaches and through slats 20' in said flanges. A similar form of bearing is provided for the rear ends of the reaches on the rear axle. This form of bearing allows the shaft and axle to oscillate slightly back and forth or vertically to accommodate themselves to any warp or twist in the wood composing the reaches. A rigid form of bearing might cramp or bind the shaft and axle in case of warping of the wood and seriously interfere with the operation of the car. The form of bearing which I employ enables the parts to be assembled quickly and avoids all fine, delicate adjustments. Instead of having the bearings fitting within mortises in the reaches I may provide straps as shown in Fig. 6 indicated by reference numerals 21' secured to the under side of the reaches by bolts 21" and having loops 23' at each end for the boxes or bearings of the shaft and axle. The straps will have sufficient spring to allow a slight vertical or lateral movement of the bearing boxes so that in case of swelling or shrinkage of the wooden reaches the bearings will not be thrown out of alinement.

Each end of the shaft 16 is provided with a crank arm 21 pivotally connected with the lower end of the operating lever 10 by pitman rods 22. These rods as indicated in Fig. 2 are located on each side of the operating lever connecting it with each end of the shaft 16 and consequently when power is applied to the upper end of the lever, it will be uniformly transmitted to both ends of the shaft and through the shaft to the gears 14 and 13 to drive the rear axle.

In place of the pinion and gear driving connection between the axle and shaft a sprocket chain and wheels may be employed if preferred. This modification will be obvious and unnecessary to illustrate.

Ordinarily in cars of this type only one crank is employed and the strain applied to one side of the gear only, resulting in uneven distribution and frequent breakage. This objection I have avoided by my improved construction and the uniform application of the power to the driving gears. By providing a movable form of bearing I am able to prevent any cramping of the shaft or binding of the gears should the reaches twist or warp out of their proper alinement.

I claim as my invention:

1. In a hand car, the combination, with the forward and rear axles and carrying wheels therefor, and the reaches connecting said axles, of a shaft having bearings at its ends in said reaches, a gear secured on said rear axle between said reaches, a gear mounted on said shaft between said reaches and meshing with said axle gear, cranks secured on the ends of said shaft, a propelling lever journaled between said reaches and depending below the same, and pitman rods connecting the lower end of said lever on each side with said crank arms, substantially as described.

2. In a hand car, the combination, with the forward and rear axles and carrying wheels, of a frame connecting said axles, a shaft having bearings in said frame, crank arms secured on said shaft, a driving means connecting said shaft and axle between said arms a single propelling lever journaled in said frame and two pitman rods connecting said crank arms with the lower end of said lever.

3. A hand car comprising forward and rear axles and carrying wheels, parallel reaches connecting said axles, said rear axle being secured on said reaches and said forward axle having a swiveled connection therewith, a pinion secured on said rear axle between said reaches, a shaft having bearings in said reaches in front of said rear axles, a gear wheel centrally mounted on said shaft and meshing with said pinion, crank arms mounted on the ends of said shaft, a propelling lever journaled in said reaches and depending below the same having an operating handle, pitman rods connecting said crank arms with the lower end of said propelling lever and a seat supported on said reaches above said shaft and in the rear of and near said propelling lever, substantially as described.

4. In a hand car, the combination, with the forward and rear axles and carrying wheels, and the reaches connecting said axles, of a shaft parallel with said rear axle and having a driving connection therewith, said shaft and axle having loose bearings in said reaches to allow them to adjust themselves to the swelling or shrinking of the wood, crank arms mounted on the ends of said shaft and a propelling lever having a pitman rod connection with said crank arms.

5. In a hand car, the combination, with the forward and rear axles, and carrying wheels and a frame connecting said axles, said frame being provided with transverse sockets and slots communicating therewith, sleeves having flanges loosely fitting within said sockets and slots, bolts passing through said flanges and loosely securing said sleeves in said sockets, a shaft having bearings in said sleeves, and a driving connection with said rear axle, a propelling lever, crank arms secured on the edge of said shaft and pitman rods connecting said crank arms with said lever.

6. The combination, with a frame and forward and rear axles and carrying wheels therefor, of a shaft journaled in said frame, crank arms mounted on said shaft, a single operating lever journaled in said frame, rods connecting said lever with said crank arms and a driving connection between said shaft and axle, and located midway between said crank arms, whereby the strain will be evenly distributed on said shaft.

7. The combination, with a frame and forward and rear axles and carrying wheels therefor, of a shaft journaled in said frame, crank arms mounted on said shaft, a single operating lever journaled at a point intermediate to its ends in said frame and having its lower end depending below said frame, pitman rods connected to said crank arms and having their forward ends inwardly curved and pivotally connected with the lower end of said lever, and a driving means connecting said shaft and rear axle between said arms.

8. The combination, with the forward and rear axles, and carrying wheels, of a frame, a shaft having bearings in said frame, crank arms secured on said shaft, a driving means connecting said shaft and axle between said arms, an operating lever, and pitman rod connections between said lever and said crank arms.

In witness whereof, I have hereunto set my hand this 7th day of June 1906.

MARSHALL B. LLOYD.

Witnesses:
RICHARD PAUL,
J. H. BALDWIN.